United States Patent [19]

Virnig et al.

[11] Patent Number: 5,908,605
[45] Date of Patent: *Jun. 1, 1999

[54] COPPER RECOVERY PROCESS

[75] Inventors: Michael J. Virnig; R. Brantley Sudderth, both of Tucson, Ariz.

[73] Assignee: Henkel Corporation, Gulph Mills, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/707,285

[22] Filed: Sep. 3, 1996

Related U.S. Application Data

[60] Provisional application No. 60/003,341, Sep. 7, 1995.

[51] Int. Cl.$^6$ ............................ C22B 15/00; C01B 31/00
[52] U.S. Cl. ................................. 423/24; 252/184
[58] Field of Search ............................... 423/24; 252/184

[56] References Cited

U.S. PATENT DOCUMENTS

| | | | |
|---|---|---|---|
| 2,727,818 | 12/1955 | Kenny et al. | 75/103 |
| 4,015,980 | 4/1977 | MacKay et al. | 75/120 |
| 4,022,866 | 5/1977 | Kuhn et al. | 423/26 |
| 4,065,502 | 12/1977 | MacKay et al. | 260/590 |
| 4,175,012 | 11/1979 | MacKay et al. | 204/108 |
| 4,252,621 | 2/1981 | Reinhardt et al. | 204/106 |
| 4,272,492 | 6/1981 | Jensen | 423/24 |
| 4,350,667 | 9/1982 | Andersson et al. | 423/24 |
| 4,563,256 | 1/1986 | Sudderth et al. | 204/108 |

OTHER PUBLICATIONS

Kuhn and Arbiter, "Physical and Chemical Separations via the Arbiter Process", 11th Int'l Mining Congress, Apr., 1975, Cagliari, Italy; Proc.—Int. Miner. Process. Congress., Paper 30; pp. 831–847.

Kuhn and Arbiter, "Anaconda's Arbiter Process for Copper", Hydrometallurgy, CIM Bulletin, Feb., 1974.

*Primary Examiner*—Steven Bos
*Attorney, Agent, or Firm*—Ernest G. Szoke; Wayne C. Jaeschke; Patrick J. Span

[57] ABSTRACT

An improvement in the process of recovery of copper from aqueous ammoniacal solutions containing copper values in which the copper values are extracted from the aqueous ammoniacal solution by an organic phase comprised of a diketone copper extractant dissolved in a water-immiscible organic hydrocarbon solvent, by improving the stripping of the copper from the organic extractant phase, in which the improved stripping results from the incorporation into, or addition to the diketone extractant phase of a catalytic amount of an hydroxy aryl oxime. Also an improved extractant composition is provided comprised of the mixture of a diketone copper extractant and a catalytic amount (preferably about 0.5 to about 5 mole % in relation to the diketone) of an hydroxy aryl oxime, such as nonyl or dodecyl salicylaldoxime.

12 Claims, No Drawings

COPPER RECOVERY PROCESS

CROSS-REFERENCE TO RELATED APPLICATIONS

This application claims priority from U.S. provisional application Ser. No. 60/003,341, filed Sep. 7, 1995, the disclosure of which is incorporated herein by reference.

FIELD OF THE INVENTION

This invention relates to a process of recovery of copper by a process of extraction of aqueous ammoniacal solutions containing copper values, resulting from various commercial processes, including, but not limited to, leaching of copper containing ores, such as sulfidic ores, or concentrates resulting from flotation of such sulfidic ores.

STATEMENT OF RELATED ART

Practice in the recovery of copper from its sulfidic ores involves subjecting the ores to a froth flotation operation to produce a concentrate of the valuable metal sulfides and to reject the flotation tailings of valueless sulfides, silicates, aluminates and the like. One of such concentrates provided is a chalcocite concentrate containing chalcocite and covellite.

In U.S. Pat. No. 4,022,866 to Kuhn and Arbiter, and in their subsequent paper, "Physical and Chemical Separations via the Arbiter Process" 11th International Mining Congress, April 1975 Cagliari, Italy; Proc.-Int. Miner. Process. Congress., Paper 30; pp. 831–847; there is described the leaching of copper sulfide concentrates with ammonia/ammonium sulfate and oxygen whereby the sulfate, and the dissolved copper may then be recovered by solvent extraction. The solvent extraction reagents are described in the patent only generally as those which preferentially load copper from alkaline solutions. In the paper, which describes the Arbiter process, the focus is on complete or nearly complete leaching of the concentrates. Another Kuhn and Arbiter paper, "Anaconda's Arbiter Process for Copper", Hydrometallurgy, CIM Bulletin , Feb. 1974, contains similar description.

U.S. Pat. No. 4,563,256 describes a solvent extraction process for the recovery of zinc values from ammoniacal solutions, which may also contain copper values, using employing various oxime extractants.

U.S. Pat. No. 2,727,818 describes a method of leaching copper sulfide materials with ammoniacal leach solutions. No solvent extraction is discussed.

U.S. Pat. Nos. 4,065,502 and 4,175,012 describe beta di-ketones which may be employed as metal extractants in a liquid-liquid ion exchange process for recovery of metals, such as nickel or copper, from aqueous solutions containing the metal values, including aqueous ammoniacal solutions.

U.S. Pat. No. 4,350,667 describes the extraction of copper from ammoniacal aqueous solutions by a process of extraction first with a beta-diketone followed by a second extraction with an oxime. Alternatively, there is described the use of a mixture of di-ketone and oxime wherein the extractant reagent comprises about 5–30 percent by volume of the strong reagent (oxime) and 10–60 percent by volume of the weak reagent (beta-diketone).

In commonly assigned, application, U.S. Ser. No. 07/745,028 now abandoned, the entire disclosure of which is hereby incorporated by reference, there is described a partial leaching of a chalcocite concentrate, to provide an aqueous ammoniacal leach solution containing copper values, and the use of a high copper transfer, low ammonia loading extraction reagent such a beta-diketone. An oxime extractant is also disclosed, alone or with the diketone.

DESCRIPTION OF THE INVENTION

In this description, in the operating examples or where explicitly otherwise indicated, all numbers describing amounts of ingredients or reaction conditions are to be understood as modified by the word "about".

It was found that when contacted with an ammoniacal solution obtained by leaching a copper sulfide concentrate with ammonia/ammonium sulfate, a preferred diketone extractant reagent, 1-phenyl-3-heptyl-1,3-propanedione, will extract the copper but upon repetitive use the copper may become more difficult to strip. It is believed the problem may arise from a synergistic interaction of surfactant type materials introduced into the organic phase through a leach liquor with a ketimine that is formed by reaction of ammonia with the beta-diketone.

It has now been discovered however, that the use of a catalytic amount of an aryl hydroxy oxime along with the use of the beta-diketone extractant in the organic extractant phase, provides a very efficient and improved process for recovery of the copper in that a significant improvement in the strip kinetics results.

While the present invention is particularly useful in applications where ammoniacal leach solutions are encountered in the treatment of copper containing sulfidic ores, the present invention is applicable or useful in the extraction of copper from any aqueous ammoniacal solution containing copper values regardless of its source.

In its general application accordingly the present invention is an improvement in the process of extraction and recovery of copper from aqueous ammoniacal solutions in a process comprising (1) contacting a copper pregnant aqueous ammoniacal solution containing copper values with a water insoluble beta-diketone copper extractant dissolved in a water immiscible organic solvent to extract copper values from said aqueous ammoniacal solution into said organic solution thereby forming a copper pregnant organic phase and a copper barren aqueous phase;

(2) separating said aqueous phase and said organic phase; contacting the copper pregnant organic phase with an aqueous acidic stripping solution whereby copper values are stripped from the organic phase into said aqueous acidic stripping solution;

(3) separating said aqueous acidic stripping solution from said organic phase; and (4) recovering the copper from said aqueous acidic stripping solution;

the improvement in the process comprising adding to, or incorporating into, a beta-diketone copper extractant a catalytic amount of an oxime compound, preferably an hydroxy, aryl oxime compound, which in itself may be an extractant for copper.

In view thereof, the present invention also contemplates a new copper extractant reagent which comprises a beta-diketone copper extractant in admixture with a catalytic amount of an oxime compound, preferably an hydroxy, aryl oxime. By catalytic amount as employed herein, is meant a small amount of the oxime in relation to the amount of diketone, preferably from about 0.5 to about 5 mole % of oxime relative to the beta-diketone.

As indicated earlier, the present invention is useful in regard to aqueous ammoniacal solutions from a variety of sources, including copper pregnant leach solutions such as those encountered in leaching of chalcocite concentrates. In such applications the copper pregnant leach solutions from which the copper is to be recovered by extraction will contain on the order of about 15–100 g/l copper and typically about 30–40 g/l copper at pH of about 8.5 to 11. In solutions encountered from other applications, the solutions may contain copper at the lower levels, on the order of 15–20 g/l, such as solutions encountered in ammoniacal copper chloride printed board etchants.

The beta-diketones are preferred extraction reagents for copper from ammoniacal solutions because of their low ammonia loading properties. These are certain beta-diketones, such as those described in U.S. Pat. Nos. 4,065,502 and 4,015,980. One such extractant found to be particularly suitable is 1-phenyl-3-heptyl-1,3-propane dione, available commercially from Henkel Corporation as LIX$_R$ 54. Other betadiketone compounds which may be employed are defined by the formula:

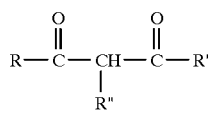

where R is phenyl or alkyl substituted phenyl, R' is alkyl, alkyl substituted phenyl or chloro substituted phenyl and R" is H or CN with the proviso that (1) when R is phenyl, R' is a branched chain alkyl group of at least seven carbon atoms and (2) when R is alkyl substituted phenyl, the number of carbon atoms in the alkyl substituents is at least 7 and at least one such alkyl substituents is a branched chain. R is desirably monoalkyl substituted and preferably contains 9 or more carbon atoms. If R is dialkyl substituted, one or more of the alkyl substituents may be lower alkyl, but the total number of carbon atoms in the two alkyl substituents should average about 6, preferably about 5 and 7 carbon atom alkyl groups are preferred; however, a mixture of isomers, both positionally around the phenyl ring may include mixtures of some C2, C3 and C4 alkyl groups. The various alkyl groups are preferably free from substitution and contain less than about 20 carbon. Further when R' is alkyl, the carbon alpha to the carbonyl group is preferably not tertiary. Preferably, R" is H, R' is a branched 7, 8, 9, 12 or 17 carbon chain or a chlorophenyl or short chain (1–5 carbon) alkyl substituted phenyl and R is phenyl or a 7, 8, 9 or 12 carbon alkyl substituted phenyl group.

The oxime compounds which are to be employed in catalytic amounts along with the beta-diketone are certain oximes such as described in U.S. Pat. No. 4,563,256. Such oximes, which may be employed are those generally conforming to the formula:

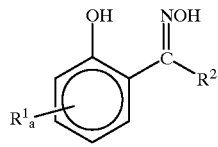

where $R^1$ is a saturated aliphatic group of 1–25 carbon atoms or an ethylenically unsaturated group of 3–25 carbon atoms or $OR^3$, where $R^3$ is a saturated or ethylenically unsaturated group as defined above, a is an integer of 0, 1, 2, 3 or 4, and $R^2$ is H, or a saturated or ethylenically unsaturated group as defined above, with the proviso that the total number of carbon atoms in $R^1$ and $R^2$ is from 3–25, or is phenyl or $R^4$ substituted phenyl, where $R^4$ is a saturated or ethylenically unsaturated group as defined above, which may be the same or different from $R^1$. Illustrative of some of the oxime compounds are 5-heptyl salicylaldoxime, 5-octyl salicylaldoxime, 5-nonyl salicylaldoxime, 5-dodecyl salicylaldoxime, 5-nonyl-2- hydroxyacetophenone oxime, 5-dodecyl-2-hydroxyacetophenone oxime 2-hydroxy-5-nonyl benzophenone oxime and 2-hydroxy-5-dodecyl benzophenone oxime. While it may be preferred that a single oxime compound be employed along with the beta-diketone, mixtures of oximes may be employed to meet particular system requirements.

A wide variety of essentially water-immiscible liquid hydrocarbon solvents can be used in the copper recovery process to form the organic phase in which the extractant is dissolved. These include aliphatic and aromatic hydrocarbons such as kerosenes, benzene, toluene, xylene and the like. A choice of essentially water-immiscible hydrocarbon solvents or mixtures thereof for commercial operations will depend on a number of factors, including the plant design of the solvent extraction plant, (mixer-settler units, extractors) and the like. The preferred solvents for use in the present invention are the aliphatic or aromatic hydrocarbons having flash points of 130 degrees Fahrenheit and higher, preferably at least 150 degrees., and solubilities in water of less than 0.1% by weight. The solvents are essentially chemically inert. Representative commercial available solvents are Chevron™ ion exchange solvent (available from Standard Oil of California) having a flash point of 195 degrees Fahrenheit; Escaid™ 100 and 110 (available from Exxon-Europe having a flash point of 180 degrees Fahrenheit); Norpar™ 12 (available from Exxon-USA, flash point 160 degrees Fahrenheit); Conoco™ C1214 (available from Conoco, flash point 160 degrees Fahrenheit) Aromatic 150 (an aromatic kerosene available from Exxon-USA having a flash point of 150 degrees Fahrenheit), and other various kerosenes and petroleum fractions available from other oil companies.

In the extraction process, the organic solvent solutions may contain the beta-diketone in an amount approaching 100° C. solids, but typically the diketone will be employed at about 20–30% by weight. The oxime will be employed in a catalytic amount as earlier described.

In the process, the volume ratios of organic:aqueous (O:A) phase will vary widely since the contacting of any quantity of the diketone organic solution with the copper containing aqueous ammoniacal solution will result in extraction of the copper values into the organic phase. For commercial practicality however, the organic:aqueous phase ratios for extraction are preferably in the range of about 50:1 to 1:50. It is desirable to maintain an effective O:A ratio of about 1:1 in the mixer unit by recycle of one of the streams. In the stripping step, the organic :aqueous stripping medium phase will preferably be in the range of about 1:2 to 20:1. For practical purposes, the extracting and stripping are normally conducted at ambient temperatures and pressures, although higher and/or lower temperatures and/or pressures are entirely operable. While the entire operation can be carried out as a batch operation, most advantageously the process is carried out continuously with the various solutions or streams being recycled to the various operation in the process for recovery of the copper, including the leaching, extraction and the stripping steps.

In the extraction process the extractant reagent should be soluble in the organic water-immiscible solvent. In general the diketone compounds and the oxime compounds described above will be soluble to such extent and amounts described above. If necessary or desirable to promote specific desired properties of extraction, solubility modifiers generally known in the art may be employed. Such modifiers include long chain (6–30 carbon) aliphatic alcohols or esters such as n-hexanol, n-2-ethylhexanol, isodecanol, isohexadecanol, 2-(1,3,3-trimethyl butyl)-5,7,7-trimethyl octanol and 2,2,4-trimethyl-1,3-pentanediol mono- or di-isobutyrate, long chain alkyl phenols, such as heptylphenol, octylphenol, nonylphenol, and dodecylphenol; and organo phosphorous compounds, such as tri-lower alkyl (4–8 carbon atom) phosphates, especially tributyl phosphate and tri-(2-ethylhexyl) phosphate. Where indicated to be desirable, kinetic modifiers may also be employed.

In the stripping step, a sulfuric acid solution containing about 60–180 g/l sulfuric acid is the preferred stripping agent as it permits the subsequent recovery of the copper by conventional recovery steps either in the form of copper sulfate crystals or by electrowinning to cathode copper. Other mineral acids may be used such as hydrochloric or nitric acid; however, such may require other recovery methods or specialized handling equipment.

The invention may be illustrated by means of the following example in which all parts and percentages are by weight unless otherwise indicated. It is understood that the purpose of the example is entirely illustrative and is in no way intended to limit the scope of the invention.

EXAMPLE

This example is to illustrate the improved stripping kinetics by the use of a catalytic amount of an oxime compound used in admixture with a beta diketone extractant (1-phenyl-3-heptyl-1,3-propanedione).

The data in Table I which follows below was generated in the following fashion:

The test vessel consisted of a 1 liter Pyrex beaker fitted with stainless steel baffles and a stirrer. The stirrer was set at 1650 rpm. The aqueous ammoniacal feed solution contained 18 g/l Cu and 45 g/l ammonia. It was prepared by dissolving 70.7 gm of copper sulfate pentahydrate and 21.5 gm ammonium sulfate in deionized water, adding 147 ml of concentrated ammonium hydroxide, and then diluting to 1 liter with deionized water. The aqueous strip solution contained 35 g/l Cu and 160 g/l sulfuric acid in deionized water.

Equal volumes of the organic phase and the aqueous strip solution were contacted for 30 minutes. The two phases were allowed to separate. The aqueous was discarded and the conditioned organic phase was then filtered through 1 PS filter paper (phase separation paper). The conditioned organic was then loaded by contacting 425 ml of the organic with 425 ml of the aqueous ammoniacal feed solution The feed solution was placed in a clean baffled beaker, the stirrer adjusted to 1650 rpm and the organic added over a period of 5 seconds. After stirring for 5 minutes, the stirrer was stopped and the phases allowed to separate. A sample of the loaded organic was removed and analyzed for copper content to give the E300 point (extraction at 300 seconds). The loaded organic was then separated from the aqueous raffinate. After 13 minutes, 320 ml of the loaded organic was transferred into a clean baffled beaker and the stirrer adjusted to 1650 rpm. At precisely 15 minutes elapsed time after stopping the agitation in the loading portion of the test, the strip aqueous (320 ml) was added to the stirring loaded organic over a period of 5 seconds. At the end of the 5 second period, a stop watch was started. At 29 seconds a 10 ml sample of the emulsion was removed from the beaker.

The sample of emulsion was allowed to drain into a beaker. The organic phase was decanted off and filtered through 1 PS paper to give a 30 second stripped organic sample which was analyzed for copper content to give the S30 point. The mixing was allowed to continue for a total of 180 seconds, the stirrer stopped and a sample of the organic was removed. It was analyzed for copper content to give the 180 second stripped organic point, S 180. To determine the maximum load of the organic phase, the organic phase was contacted 4 times by shaking for 2 minutes in a separatory funnel with fresh volumes of ammoniacal aqueous feed solution at an organic to aqueous ratio of 1:2. The maximum loaded organic was filtered through 1 PS paper and analyzed for copper content to give the maximum load point (ML). All analyses for copper content in Table I below were carried out by atomic absorption spectroscopy.

TABLE I

|  | Diketone | Circuit Org. A | Circuit Org B | Circ Org B + oxime A | Circ Org B + oxime B |
|---|---|---|---|---|---|
| M.L. (g/l cu) | — | — | 29.20 | — | — |
| E300 (g/l cu) | 15.52 | 17.29 | 17.15 | 16.98 | 15.97 |
| S30 (g/l cu) | 0.02 | 7.82 | 8.52 | 2.84 | 7.43 |
| S180 (g/l cu) | 0.00 | 0.42 | 0.43 | 0.23 | 0.22 |
| Strip Kin @ 30 sec. (%) | 100 | 56 | 52 | 85 | 54 |

Notes:
1. Data for diketone, commercial lot # 404510016 represents data for fresh organic prepared by diluting 115 ml of diketone to 500 ml with Conoco 170B an aliphatic diluent.
2. Circuit Organic A from units used in treating ammoniacal copper chloride printed circuit board etchants.
3. Circuit Organic B from commercial mining operation extracting copper.
4. Oxime A was dodecyl salicylaldoxime.
5. Oxime B was 5,8-diethyl-7-hydroxydodecan-6-oxime.

What is claimed is:
1. In a process for the recovery of copper from an aqueous ammoniacal solution containing copper values comprising:
(A) contacting a copper pregnant aqueous ammoniacal solution containing copper values with an organic solution comprised of an insoluble beta-diketone copper extractant dissolved in a water-immiscible organic solvent to extract copper values from said aqueous ammoniacal solution into said organic solution thereby forming a copper pregnant organic phase and a copper barren aqueous phase;
(B) separating said aqueous phase and said organic phase;
(C) contacting the copper pregnant organic phase with an aqueous acidic stripping solution whereby copper values are stripped from the organic phase into said aqueous acidic stripping solution;
(D) separating said aqueous acidic stripping solution, now containing the copper values from the organic phase; and
(E) recovering the copper from the aqueous acidic stripping solution;
wherein stripping kinetics are improved by incorporating into, or adding to the diketone extractant, an hydroxy oxime in a catalytic amount of about 0.5 to about 5 mole % relative to the diketone extractant.

2. A process as defined in claim 1, wherein said diketone is 1-phenyl-3-heptyl-1,3-propane dione.

3. A process as defined in claim 1, wherein said oxime is selected from the group consisting of dodecylsalicylaldoxime and 5,8-diethyl-7-hydroxydodecan-6-oxime.

4. A process as defined in claim 1, wherein said oxime has the formula:

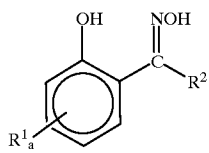

where $R^1$ is a saturated aliphatic group of 1–25 carbon atoms or an ethylenically unsaturated group of 3–25 carbon atoms or $OR_3$ where $R^3$ is a saturated or ethylenically unsaturated group as defined above, a is an integer of 0, 1, 2, 3 or 4 and $R^2$ is H or a saturated or ethylenically unsaturated group as defined above, with the proviso that the total number of carbon atoms in $R^1$ and $R^2$ is from 3–25, or is phenyl or $R^4$ substituted phenyl, where $R^4$ is a saturated or ethylenically unsaturated group as defined above, which may be the same or different from $R^1$.

5. A process as defined in claim 4, wherein said oxime is an alkyl salicylaldoxime in which the alkyl group is selected from the group consisting of heptyl, octyl, nonyl and dodecyl.

6. A process as defined in claim 4, wherein the oxime is a ketoxime selected from the group consisting of 5-nonyl-2-hydroxy acetophenone oxime, 5-dodecyl-2-hydroxyacetophenone oxime, 2-hydroxy-5-nonyl benzophenone oxime and 2-hydroxy-5-dodecyl benzophenone oxime.

7. A copper extractant composition adapted for extracting copper values from aqueous ammoniacal copper containing solutions comprising a mixture of a diketone copper extractant and an hydroxyl oxime in a catalytic amount of about 0.5 to about 5 mole % relative to the diketone extractant.

8. A copper extractant composition as defined in claim 7 in which said diketone is 1-phenyl-3-heptyl-1,3-propane dione.

9. A copper extractant composition as defined in claim 7, wherein said oxime is selected from the group consisting of dodecylsalicylaldoxime and 5,8-diethyl-7-hydroxydodecan-6-oxime.

10. A copper extractant composition as defined in claim 7, wherein said oxime has the formula:

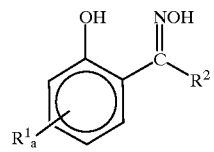

where $R^1$ is a saturated aliphatic group of 1–25 carbon atoms or an ethylenically unsaturated group of 3–25 carbon atoms or $oR^3$ where $R^3$ is a saturated or ethylenically unsaturated group as defined above, a is an integer of 0, 1, 2, 3 or 4 and $R^2$ is H or a saturated or ethylenically unsaturated group as defined above, with the proviso that the total number of carbon atoms in $R^1$ and $R^2$ is from 3–25, or is phenyl or $R^4$ substituted phenyl, where $R^4$ is a saturated or ethylenically unsaturated group as defined above, which may be the same or different from $R^1$.

11. A copper extractant composition as defined in claim 10, wherein said oxime is an alkyl salicylaldoxime in which the alkyl group is selected from the group consisting of heptyl, octyl, nonyl and dodecyl.

12. A copper extractant as defined in claim 10, wherein said oxime is selected from the group consisting of 5-nonyl-2-hydroxyacetophenone oxime, 5-dodecyl-2-hydroxyacetophenone oxime, 5-dodecyl-2-hydroxyacetophenone oxime, 2-hydroxy-5-nonyl benzophenone oxime and 2-hydroxy-5-dodecyl benzophenone oxime.

\* \* \* \* \*